US006435473B1

(12) United States Patent
Dall'Osso et al.

(10) Patent No.: US 6,435,473 B1
(45) Date of Patent: Aug. 20, 2002

(54) BUTTERFLY BODY

(75) Inventors: Carlo Dall'Osso, Zola Predosa; Giuseppe Gamberini; Mengoli Mauro, both of Bologna, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/706,156

(22) Filed: Nov. 3, 2000

(30) Foreign Application Priority Data

Nov. 5, 1999 (IT) ........................................ B099A0595

(51) Int. Cl.[7] .......................... F02D 11/10; F16K 31/04
(52) U.S. Cl. .................................. 251/129.11; 251/366
(58) Field of Search ........................... 251/305, 129.11, 251/366, 368

(56) References Cited

U.S. PATENT DOCUMENTS

| | | | |
|---|---|---|---|
| 5,370,148 A | * 12/1994 | Shafer | 251/306 X |
| 5,718,202 A | 2/1998 | Bentz | |

FOREIGN PATENT DOCUMENTS

| | | |
|---|---|---|
| DE | 198 11 867 | 10/1998 |
| EP | 0 315 794 | 5/1989 |
| EP | 0 844 378 | 5/1998 |
| EP | 0 982 483 | 3/2000 |

OTHER PUBLICATIONS

Patent Abstract of Japan, vol. 1999, No. 8, Jun. 30, 1999.

* cited by examiner

*Primary Examiner*—Kevin Lee
(74) *Attorney, Agent, or Firm*—Morgan & Finnegan, LLP

(57) ABSTRACT

A butterfly body provided with a valve body having a through duct, a butterfly valve moving on command within the through duct in order to regulate the flow of fluid through this through duct and a device for moving the butterfly valve mechanically coupled to this butterfly valve in order to be able to vary, on command, the position of the latter within the duct, so as to control the flow of air flowing through the through duct, the valve body being made entirely from plastic and having, embedded within it, a bushing of metal, within which the electrical actuator controlling the displacements of the butterfly valve is adapted to be housed.

7 Claims, 3 Drawing Sheets

BUTTERFLY BODY

The present invention relates to a butterfly body.

The present invention relates in particular to a butterfly body with a motor-driven control of the butterfly valve, particularly adapted to be mounted on an internal combustion engine for automobile vehicles and the like; the following description will make explicit reference to this application without entering into superfluous detail.

BACKGROUND OF THE INVENTION

As is known, the butterfly bodies for automobile engineering uses that are commercially available at present can be divided into two groups: the first group includes butterfly bodies in which the butterfly valve is controlled by cable and the second group includes butterfly bodies in which the butterfly valve is controlled by means of electrical actuators.

Normally, butterfly bodies of the first group are made almost entirely from plastic in order to minimise production costs, while butterfly bodies of the second group still continue to be made almost entirely from metal, in order to ensure sufficient heat dispersion for the electrical actuator.

Unfortunately, butterfly bodies of the second group have very high production costs which, as they are substantially higher than those of butterfly bodies of the first group, prevent their wide-scale use despite the advantages that their use would provide from the point of view of reducing polluting emissions.

The butterfly bodies of the second group are designed such that they can be driven directly by the electronic control unit of the engine and are therefore able accurately to regulate the intake of air to the internal combustion engine as a function of its operating conditions, irrespective of the demands of the driver.

SUMMARY OF THE INVENTION

The object of the present invention is to provide a butterfly body of the second group whose production costs are comparable to those of a butterfly body of the first group.

The present invention therefore relates to a butterfly body comprising a valve body provided with a through duct, a butterfly valve moving on command within this through duct in order to regulate the flow of fluid through the through duct, and a device for moving the butterfly valve mechanically coupled to this butterfly valve in order to be able to vary, on command, the position of the latter within the duct so as to control the flow of air flowing through the through duct, this movement device comprising an electrical actuator, and the butterfly body being characterised in that the valve body is made from plastic and is provided with a bushing of metal, within which the electrical actuator is adapted to be housed.

BRIEF DESCRIPTION OF THE DRAWINGS

The present invention will be described below with reference to the accompanying drawings, which show a non-limiting embodiment thereof, and in which.

DETAILED DESCRIPTION OF THE INVENTION

Figure 1:
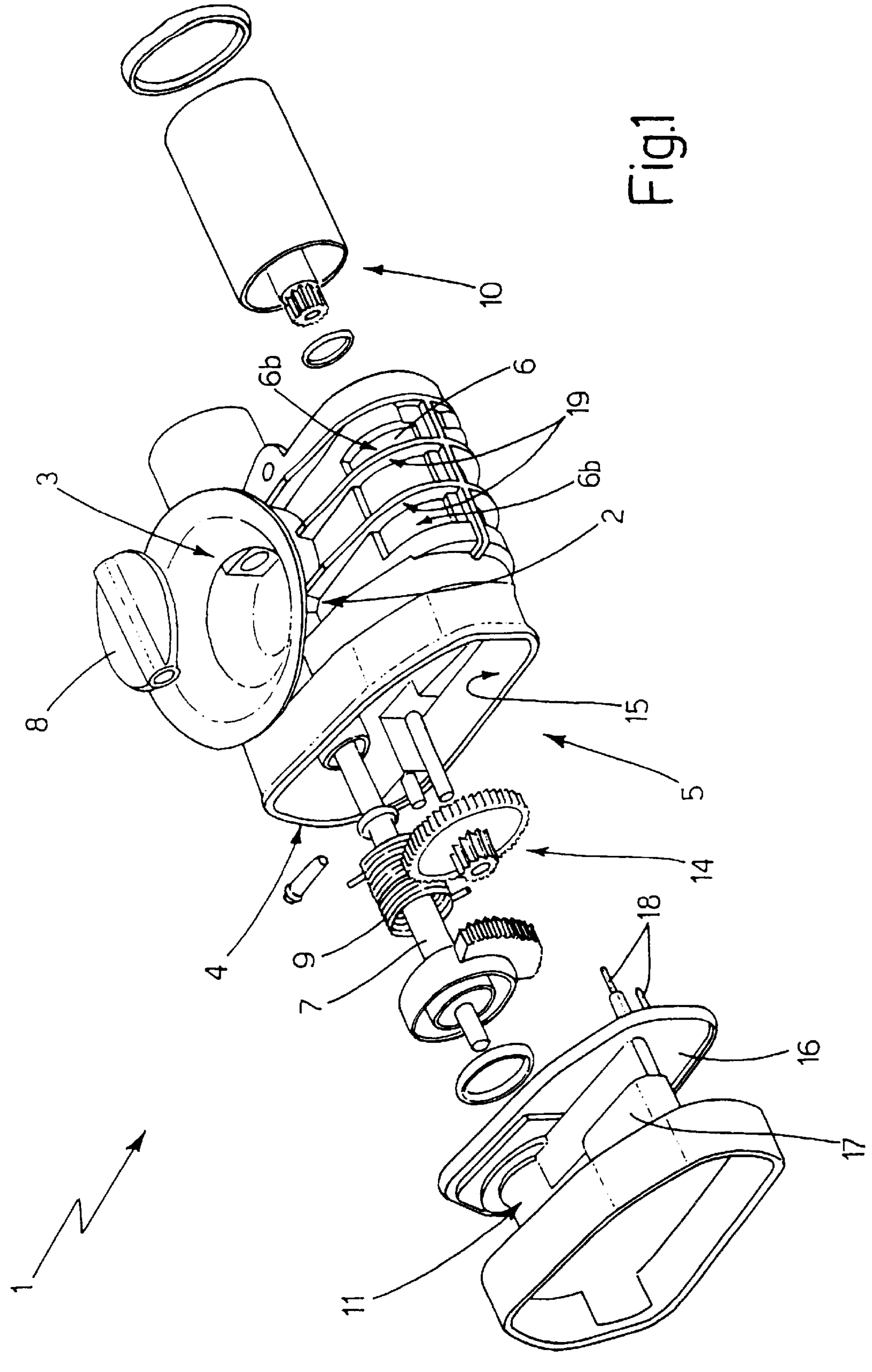
FIG. 1 is an exploded perspective view of a butterfly body of the present invention.

In FIG. 1, a butterfly body which is preferably but not necessarily motor-driven, adapted to be mounted on internal combustion engines for automobile vehicles and the like, is shown by reference numeral 1.

The butterfly body 1 comprises a valve body 2 provided with a through duct 3 having a substantially circular cross-section, adapted to be connected to the intake manifold (not shown) of a generic internal combustion engine, a butterfly valve 4 moving on command within the duct 3 between a closed position, in which it closes off the duct 3 in a fluid-tight manner, and a position of maximum opening in which it enables air to flow through the duct 3 at the maximum possible rate of flow, and a device 5 for moving the butterfly valve 4 mechanically coupled to this butterfly valve 4 so as to be able to vary, on command, the position of the latter within the duct 3 in order to control the flow of air flowing through this duct 3.

In FIGS. 1, 2, 3 and 4, the valve body 2 is made from plastic and has, embedded within it, a bushing 6 of metal adapted to house, as will be explained below, a component of the device 5 for moving the butterfly valve 4. The butterfly valve 4 comprises a support shaft 7, mounted to pass through the valve body 2 so as to be able to rotate about an axis A of rotation perpendicular to the longitudinal axis B of the duct 3, and a shutter disc 8 keyed on the central portion of the support shaft 7 which traverses the duct 3 diametrically. Both the support shaft 7 and the shutter disc 8 are preferably, but not necessarily, made from plastic.

Figure 3:
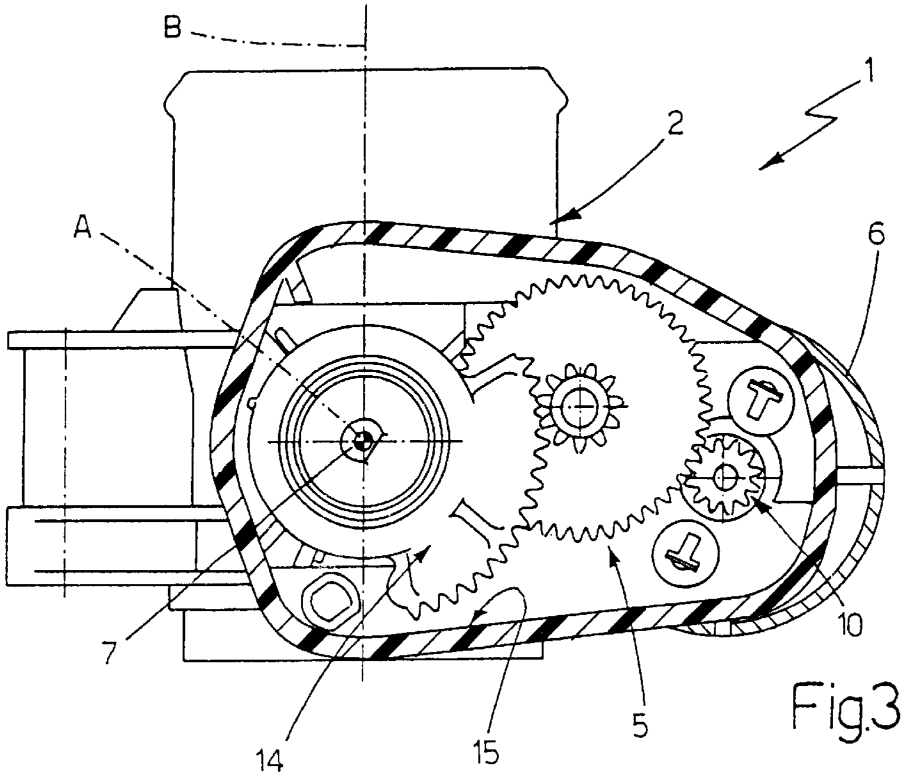
FIGS. 3 and 4 are lateral views of the butterfly body of FIG. 1, with some parts in cross-section and other parts removed for clarity.
Figure 4:
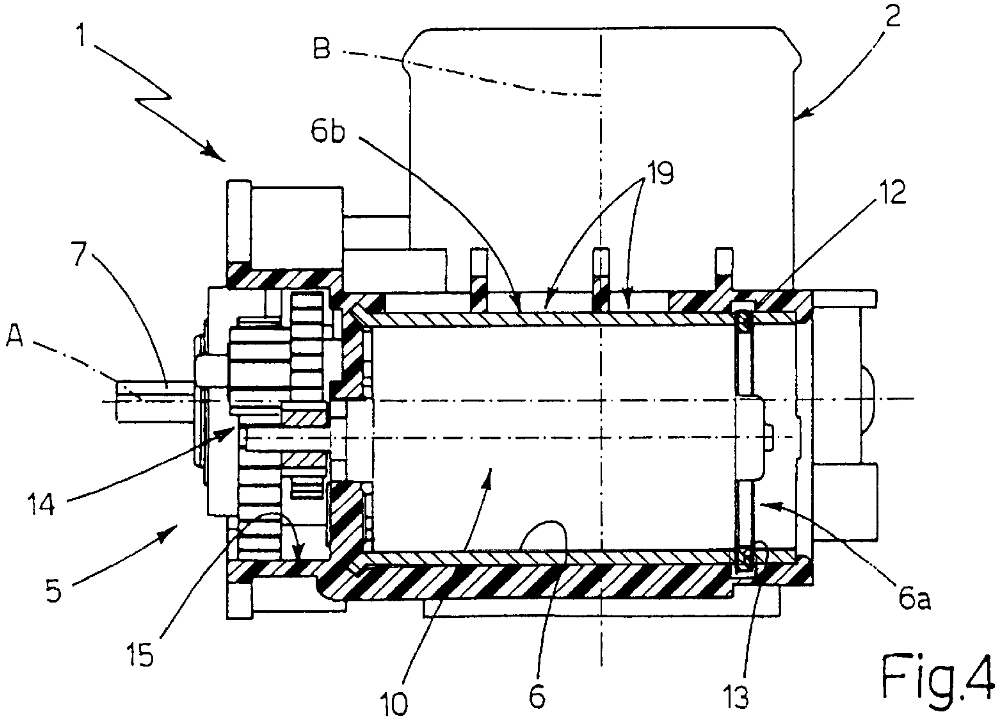

In FIGS. 1, 3 and 4, the device 5 for moving the butterfly valve 4 comprises an elastic member 9 adapted to maintain the butterfly valve 4 in the closed position, and an electrical actuator 10 mechanically coupled to the butterfly valve 4 so as to be able to exert a torque on the support shaft 7 able to position the butterfly valve 4 in any position between the closed position and the position of maximum opening, by overcoming the recall force of the elastic member 9.

According to a different embodiment of the butterfly body 1 (not shown), the device 5 for moving the butterfly valve 4 comprises an auxiliary elastic member adapted to maintain the butterfly valve 4 in an intermediate position lying between the closed position and the position of maximum opening in which a predetermined quantity of air may reach the internal combustion engine, by overcoming the action of the elastic member 9, while the electrical actuator 10 is able to exert a torque on the support shaft 7 in both directions of rotation so as to be able to position, on command, the butterfly valve 4 in any position between the closed position and the position of maximum opening, by overcoming the recall force of the elastic member 9 or the recall force of the above-mentioned auxiliary elastic member.

In both embodiments, the device 5 for moving the butterfly valve 4 is preferably, but not necessarily, further provided with a position sensor 11 adapted instant by instant to determine the angular position of the support shaft 7 with respect to a predetermined reference, and to communicate this position to the electronic control unit of the engine (not shown).

In the embodiment shown, the elastic member 9 is formed by a helical spring mounted coaxially to the support shaft 7 of the butterfly valve 4, so as to have a first end rigid with the valve body 2 and a second end rigid with the support shaft 7.

The electrical actuator 10 is, however, housed within the bushing 6 to the side of the duct 3 and is held in position by locking means contained in this bushing 6. The bushing 6 defines, within the valve body 2, a cylindrical seat that has an open end through which the electrical actuator 10 is adapted to be inserted and then locked.

In the embodiment shown, the bushing 6 is made from aluminium, while its locking means comprise an elastic locking ring 12 adapted to be inserted, by deformation, within an annular groove 13 obtained on the inner lateral surface 6*a* of the bushing 6 in the vicinity of the opening of the cylindrical seat. The electrical actuator 10 is positioned within the bushing 6 with a first end of its outer carcass in abutment on the base of the cylindrical seat defined by the bushing 6 and a second end in abutment on the elastic locking ring 12. It will be appreciated that the annular groove 13 is obtained on the inner lateral surface 6*a* of the bushing 6 at a distance from the base of the cylindrical seat such as to prevent any axial displacement of the electrical actuator 10.

With reference to FIGS. 1, 2, 3 and 4, it should be stressed that in the embodiment shown the bushing 6 extends in the valve body 2 parallel to the support shaft 7 of the butterfly valve 4 such that the wall of the bushing 6 is positioned to the rear of the duct 3 so as to minimise bulk. As the electrical actuator 10 is not disposed coaxially to the support shaft 7 of the butterfly valve 4, the device 5 for moving the butterfly valve 4 also comprises a gear reducer unit 14 adapted mechanically to connect the output shaft of the electrical actuator 10 with the support shaft 7 of the butterfly valve 4.

In the embodiment shown, this gear reducer is housed within a housing 15 which is obtained directly in the valve body 2 and is closed by a plastic cover 16 in which both the position sensor 11 and the connectors for the electrical supply of the electrical actuator 10 and the position sensor 11 are incorporated. The cover 15 in particular has an outer connector 17 via which the electronic control unit of the engine is connected to the butterfly body 1 in order to supply the electrical actuator 10 and the position sensor 11, and to receive the electrical signals transmitted by the position sensor 11, and an inner connector 18 adapted to be connected to the electrical actuator 10 in order to connect the latter electrically to the outer connector 17.

In the embodiment shown, the inner connector 18 extends in a projecting manner from the cover 16 on the side opposite the outer connector 17, so as to be connected to the electrical actuator 10 when the cover 16 is disposed to close the housing 15.

Figure 2:
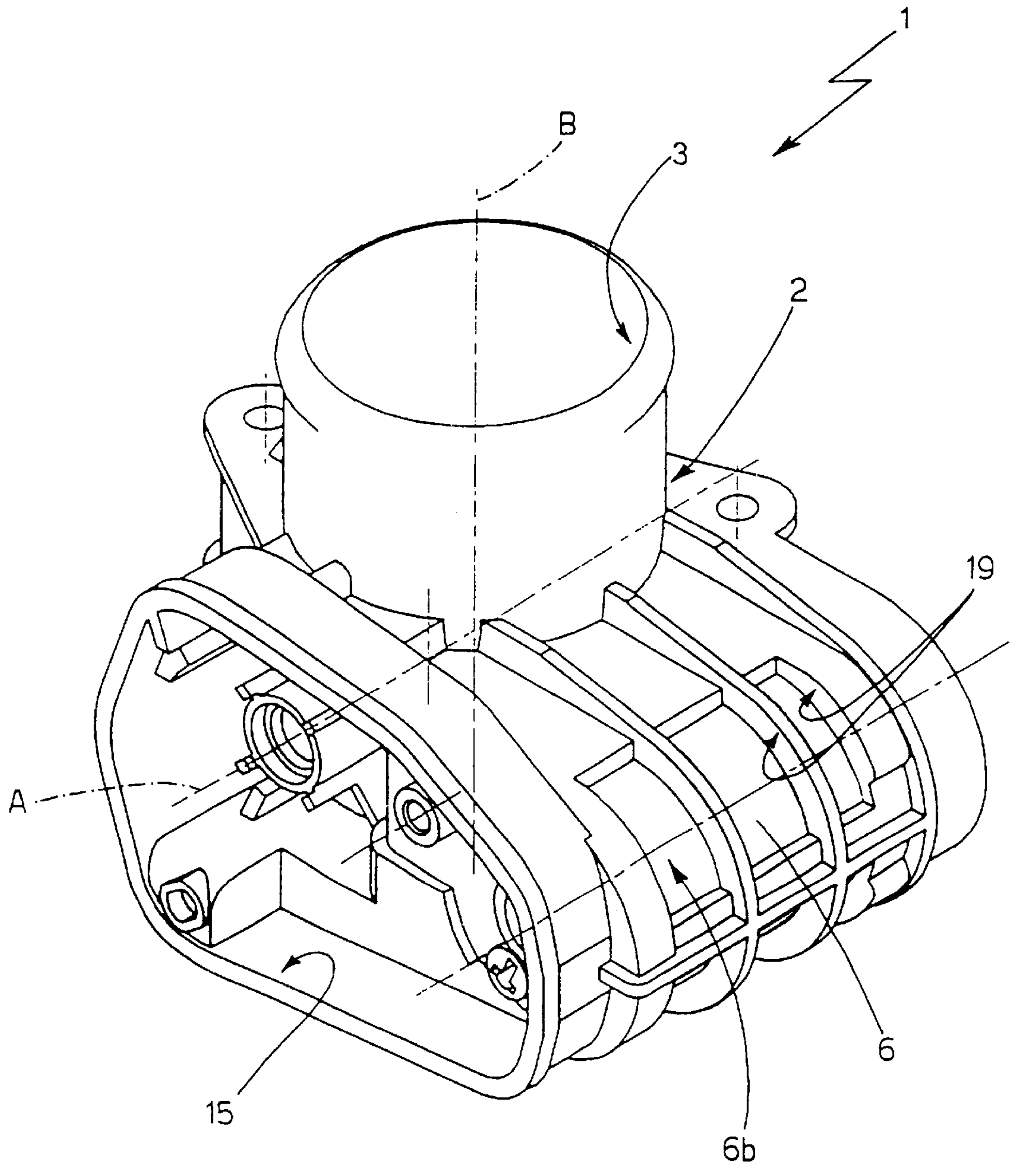
FIG. 2 is a perspective view, on an enlarged scale, of a detail of the butterfly body of FIG. 1.

With reference to FIGS. 1, 2 and 4, it should be stressed that, in the embodiment shown, in order to maximise the heat removal capacity of the bushing 6, openings 19 are provided on the valve body 2 via which atmospheric air can directly strike the outer lateral surface 6*b* of the bushing 6.

The operation of the butterfly body 1 can be readily deduced from the above description and illustration and does not require further explanation.

The advantages of the butterfly body 1 described and illustrated above are evident: its production costs are comparable with those of butterfly bodies in which the butterfly valve is controlled by cable, thereby promoting the widespread use of butterfly bodies with a motor-driven valve control.

It will be appreciated that modifications and variations may be made to the butterfly body 1 described and illustrated without thereby departing from the scope of the present invention.

In particular, the electrical actuator 10 may be disposed coaxially to the support shaft 7 of the butterfly valve 4 so as connect the electrical actuator 10 directly to the support shaft 7 of the butterfly valve 4. In this case the bushing 6 is disposed coaxially to the axis A of rotation of the butterfly valve 4.

What is claimed is:

1. A butterfly body (1) comprising a valve body (2) provided with a through duct (3), a butterfly valve (4), moving, on command, within the through duct (3) in order to regulate the flow of fluid through the through duct (3), and a device (5) for moving the butterfly valve (4) mechanically coupled to the butterfly valve (4) in order to be able to vary, on command, the position of the latter within the duct (3), so as to control the flow of air flowing through the through duct (3), a movement device (5) comprising an electrical actuator (10), and the butterfly body (1) being characterized in that the valve body (2) is made from plastic and is provided with a bushing (6) of metal, within which the electrical actuator (10) is adapted to be housed.

2. A butterfly body as claimed in claim 1, characterized in that the butterfly valve (4) comprises a support shaft (7), mounted to pass through the valve body (2) so that the valve body can rotate about an axis of rotation (A) perpendicular to the through duct (3), and a shutter disc (8) keyed on a central portion of the support shaft (7) which traverses the duct (3) diametrically, the electrical actuator (10) being adapted to rotate the support shaft (7) about its axis of rotation (A).

3. A butterfly body as claimed in claim 2, characterised in that the bushing (6) is embedded within the valve body (2) and defines a cylindrical seat which has an open end via which the electrical actuator (10) can be inserted.

4. A butterfly body as claimed in claim 3, characterized in that the bushing (6) comprises locking means (12, 13) adapted to lock the electrical actuator (10) within the bushing (6).

5. A butterfly body as claimed in claim 1, characterised in that the bushing (6) extends parallel to the axis of rotation (A) of the support shaft (7) of the butterfly valve (4) to the side of the through duct (3).

6. A butterfly body as claimed in claim 1, characterised in that the valve body (2) has a plurality of openings (19) through which atmospheric air may directly strike the outer lateral surface (6*b*) of the bushing (6).

7. A butterfly body as claimed in claim 1, characterised in that the bushing (6) is made from aluminium.

* * * * *